US 6,533,310 B2

(12) United States Patent  (10) Patent No.: US 6,533,310 B2
O'Shea et al.  (45) Date of Patent: Mar. 18, 2003

(54) COLLAPSIBLE STROLLER

(75) Inventors: Timothy J. C. O'Shea, Seattle, WA (US); William H. Ayre, Seattle, WA (US)

(73) Assignee: American Recreation Products, Inc., St. Louis, MO (US)

( * ) Notice: Subject to any disclaimer, the term of this patent is extended or adjusted under 35 U.S.C. 154(b) by 0 days.

(21) Appl. No.: 09/969,070

(22) Filed: Oct. 2, 2001

(65) Prior Publication Data
US 2002/0014758 A1 Feb. 7, 2002

Related U.S. Application Data

(63) Continuation of application No. 09/415,096, filed on Oct. 8, 1999, now Pat. No. 6,325,406.

(51) Int. Cl.$^7$ ................................. B62B 7/06
(52) U.S. Cl. ..................... 280/644; 280/650; 280/62
(58) Field of Search ................. 280/642, 42, 650, 280/62, 644, 643; 297/45, 44

(56) References Cited

U.S. PATENT DOCUMENTS

| 2,471,462 A | 5/1949 | Toth |
| 2,494,199 A | 1/1950 | Provitola et al. |
| 2,672,348 A | 3/1954 | Scott |
| 3,357,729 A | 12/1967 | Krueger |
| 3,390,893 A | * 7/1968 | MacLaren ................. 280/650 |
| 3,563,592 A | 2/1971 | Preston |
| 3,836,164 A | 9/1974 | Sugino et al. |
| 3,936,069 A | 2/1976 | Giordani |
| 3,995,882 A | 12/1976 | Watkins |
| 4,077,641 A | 3/1978 | Perego |
| 4,118,052 A | 10/1978 | Cabagnero |
| 4,132,429 A | 1/1979 | Woods |
| 4,266,807 A | 5/1981 | Griffin |
| 4,640,519 A | 2/1987 | Bigo |
| 4,953,880 A | 9/1990 | Sudakoff et al. |
| 5,029,891 A | 7/1991 | Jacobs |
| 5,123,670 A | 6/1992 | Chen |
| 5,188,389 A | 2/1993 | Baechler et al. |
| 5,356,171 A | 10/1994 | Schmidlin et al. |
| 5,364,119 A | 11/1994 | Leu |
| 5,468,009 A | 11/1995 | Eyman et al. |
| D371,094 S | 6/1996 | Hinkston |
| 5,522,614 A | 6/1996 | Eyman et al. |
| 5,536,033 A | 7/1996 | Hinkston |
| 5,558,357 A | 9/1996 | Wang |
| 5,590,896 A | 1/1997 | Eichhorn |
| 5,647,601 A | 7/1997 | Potter et al. |
| 5,669,624 A | 9/1997 | Eichhorn |
| 5,695,212 A | * 12/1997 | Hinkston ................. 280/642 |
| 5,743,552 A | * 4/1998 | Baechler et al. ............ 280/642 |
| 5,755,455 A | * 5/1998 | Chen et al. ............... 280/642 |
| 5,845,925 A | * 12/1998 | Huang ..................... 280/642 |
| 5,863,061 A | * 1/1999 | Ziegler et al. ............. 280/642 |
| 6,053,525 A | 4/2000 | Lin |

* cited by examiner

Primary Examiner—Avraham Lerner
(74) Attorney, Agent, or Firm—Senniger, Powers, Leavitt & Roedel

(57) ABSTRACT

A collapsible three-wheeled stroller for transporting a child includes a frame movable between folded and unfolded conditions, a handle mounted on an upper portion of the frame for pushing the stroller, one front wheel and two rear wheels rotatably mounted on a lower portion of the frame, and a seat on the frame for supporting a child. The frame is constructed from a plurality of articulated frame members movable from the unfolded condition to the folded condition with accompanying motion of the rear wheels toward one another and a generally forward and downward motion of the handle.

21 Claims, 8 Drawing Sheets

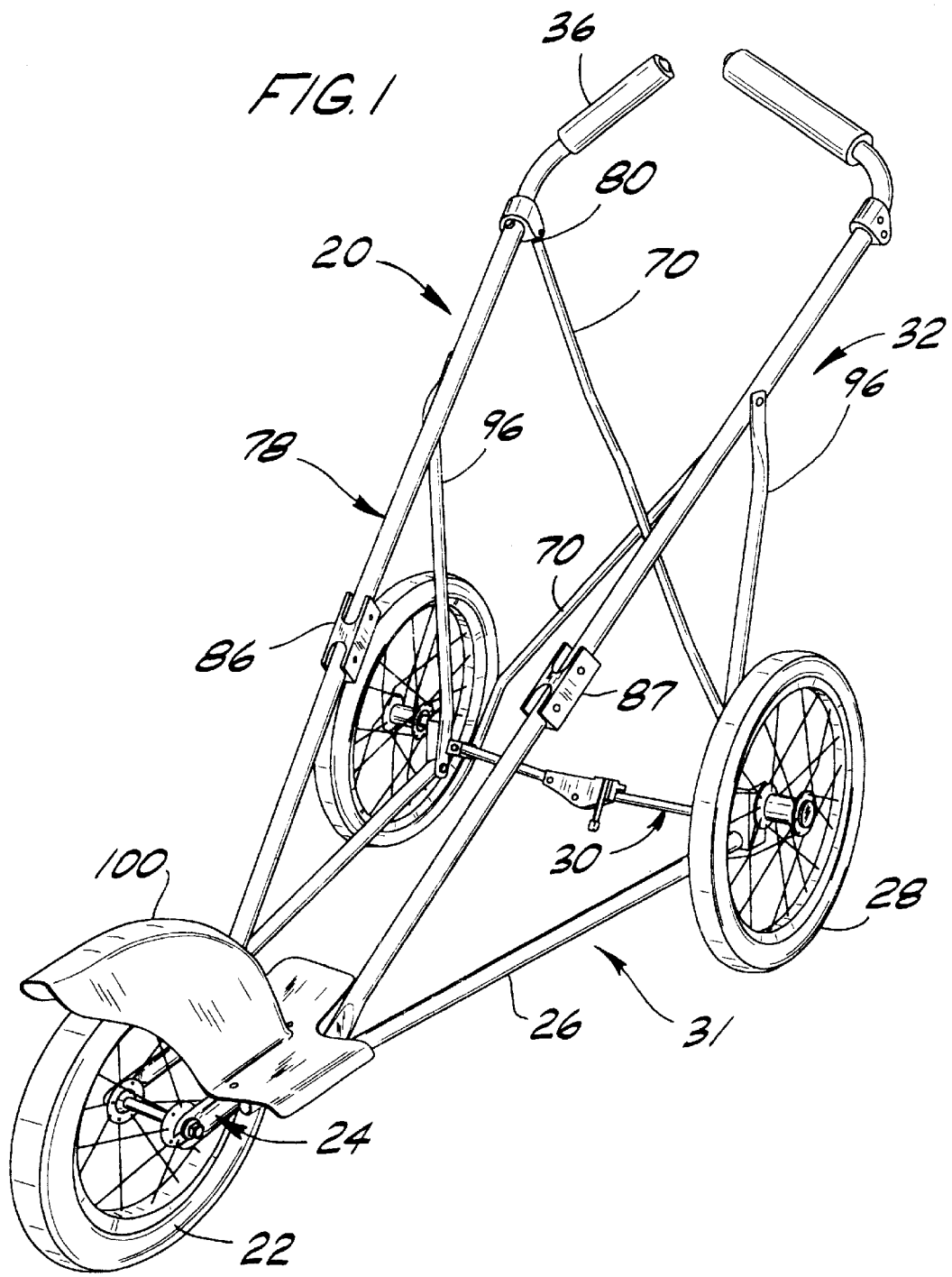

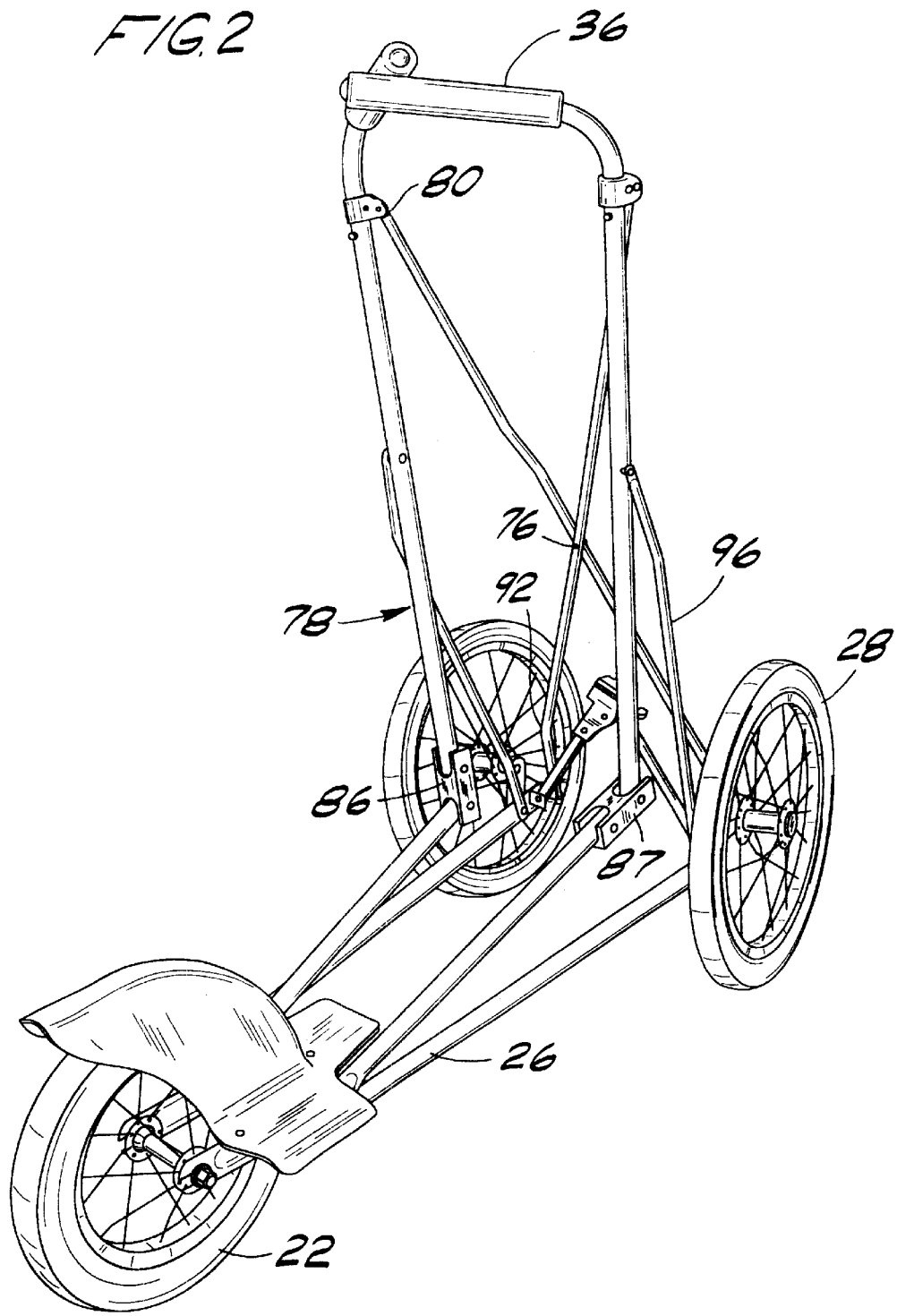

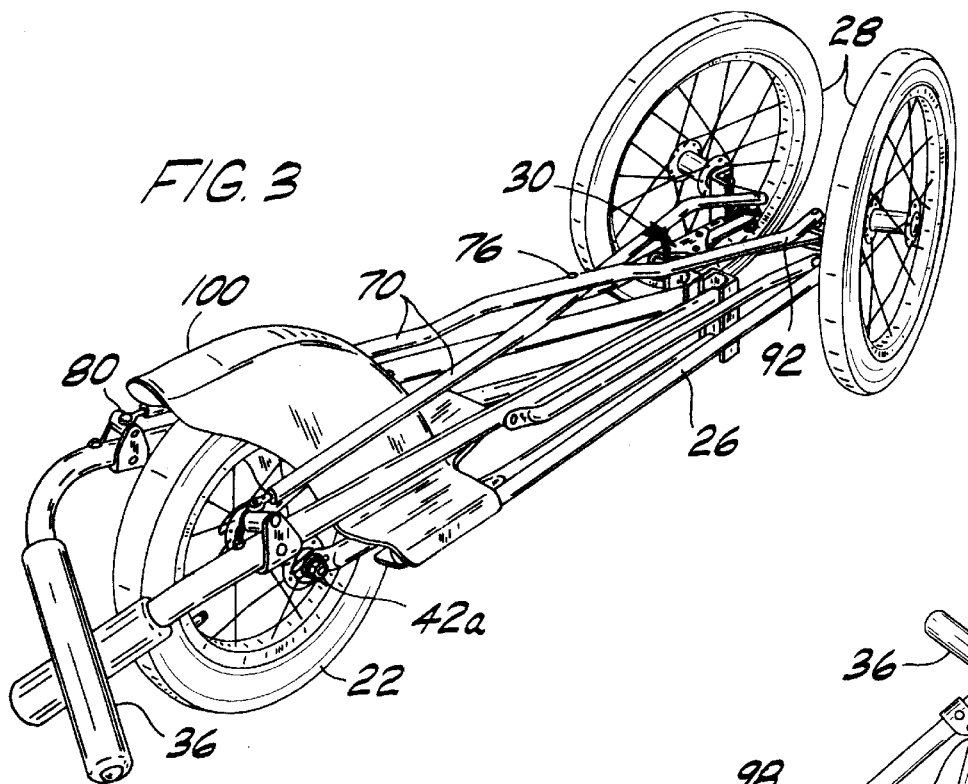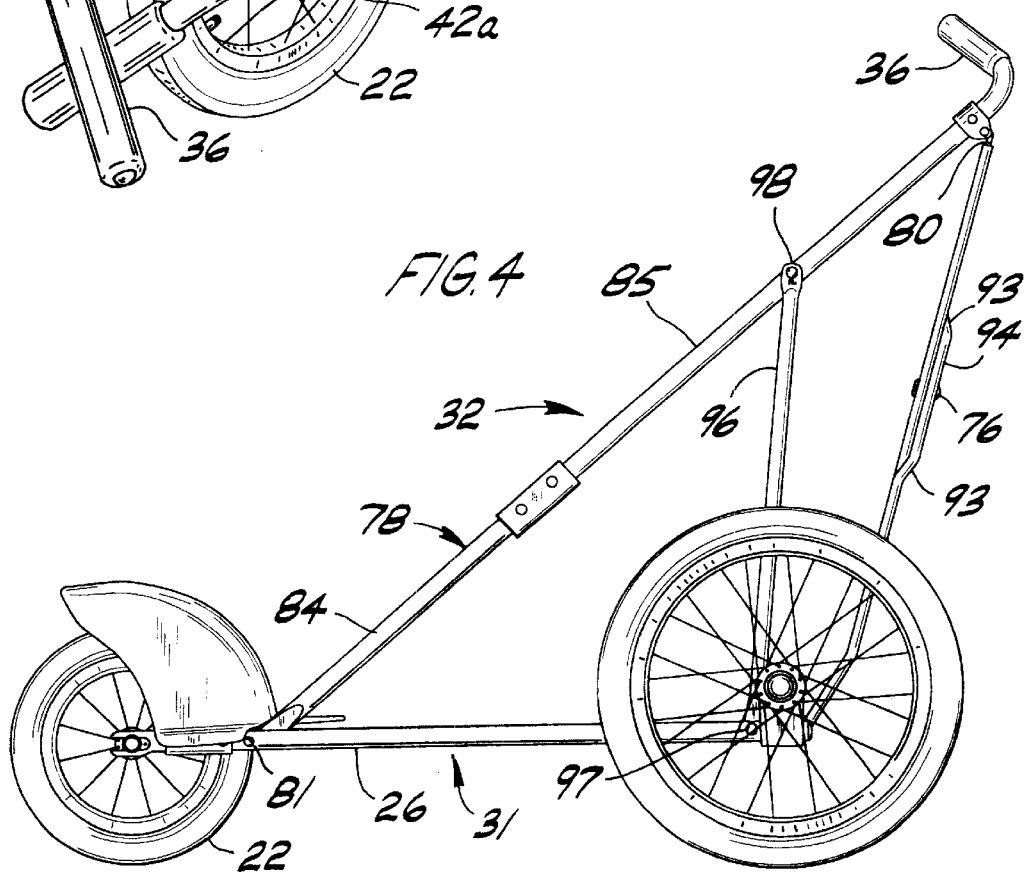

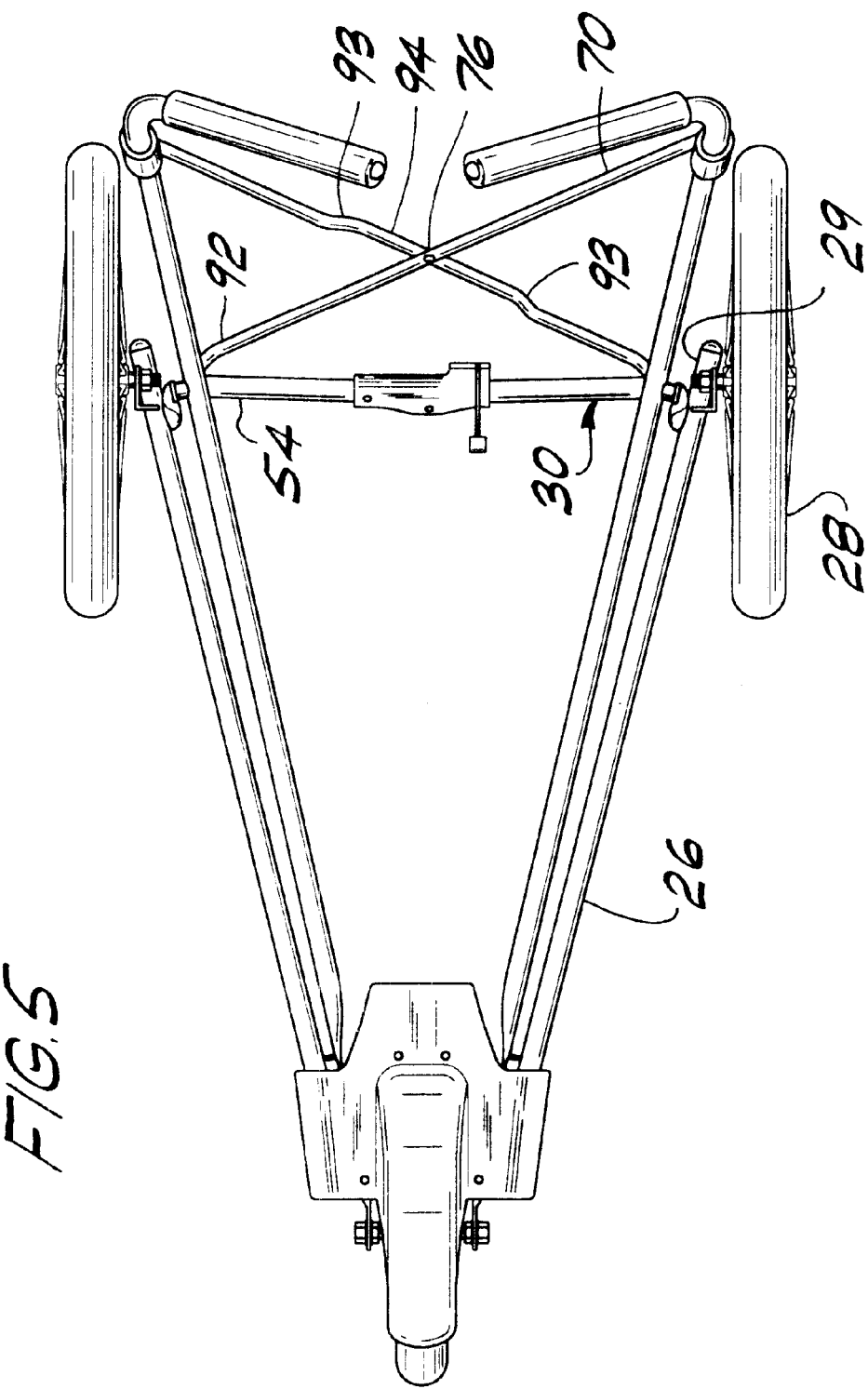

COLLAPSIBLE STROLLER

CROSS-REFERENCE TO RELATED APPLICATION

This application is a continuation of U.S. patent application Ser. No. 09/415,096 filed Oct. 8, 1999 now U.S. Pat. NO. 6,325,406 which is hereby incorporated by reference.

BACKGROUND OF THE INVENTION

The present invention relates generally to a stroller for transporting a child and more particularly to a three-wheel stroller having a generally triangular lower frame.

In recent years, strollers designed to allow an adult to jog or run while pushing a child and which are usable on uneven terrain have gained popularity. "Jogging strollers", as they are commonly called, have more rugged frames and larger wheels than traditional strollers. These features are necessary to provide a stroller that is more stable in use at higher speeds and over uneven terrain. However, the rugged frames and larger wheels of jogging strollers also make them more difficult to collapse or disassemble. Indeed, several steps are typically required to collapse most jogging strollers. Moreover, most collapsed jogging strollers are still relatively bulky, which makes them harder to lift and prevents them from being easily stowed in a vehicle or a garage.

SUMMARY OF THE INVENTION

Among the several objects and features of the present invention may be noted the provision of a stroller capable of safely supporting a child while being pushed by a jogger; the provision of such a stroller that is easily collapsible; the provision of such a stroller that is relatively compact when it is in a collapsed position; and the provision of such a stroller that is usable over uneven terrain.

Briefly, this invention is directed to a collapsible stroller for transporting a child. The stroller includes a frame movable between folded and unfolded conditions, a handle mounted on an upper portion of the frame for pushing the stroller, one front wheel and two rear wheels rotatably mounted on a lower portion of the frame, and a seat on the frame for supporting a child. The frame is constructed from a plurality of articulated frame members movable from the unfolded condition to the folded condition with accompanying motion of the rear wheels toward one another and a generally forward and downward motion of the handle.

A method of collapsing a collapsible three-wheeled stroller is disclosed wherein the stroller frame includes upper and lower portions movable between folded and unfolded conditions. The frame comprises a plurality of articulated frame members, a handle mounted on the upper portion of the frame for pushing the stroller, only one front wheel and two rear wheels rotatably mounted on the lower portion of the frame, a seat on the frame for supporting a child, and a latching device for locking the frame in the unfolded condition. The method comprises simultaneously disengaging the latching device and moving one of said articulated frame members toward a collapsed position to cause accompanying motion of the rear wheels toward one another and a generally forward and downward motion of the handle.

Other objects and features of the present invention will be in part apparent and in part pointed out hereinafter.

BRIEF DESCRIPTION OF THE DRAWINGS

FIG. 1 is a perspective view of a stroller of the invention;

FIG. 2 is a perspective view of the stroller in a partially folded condition;

FIG. 3 is a perspective view of the stroller in a completely folded condition;

FIG. 4 is a side elevation of the stroller in an unfolded condition;

FIG. 5 is a top plan view of the stroller in the unfolded condition;

Corresponding reference characters indicate corresponding parts throughout the several views of the drawings.

DETAILED DESCRIPTION OF THE PREFERRED EMBODIMENT

Figure 1A:
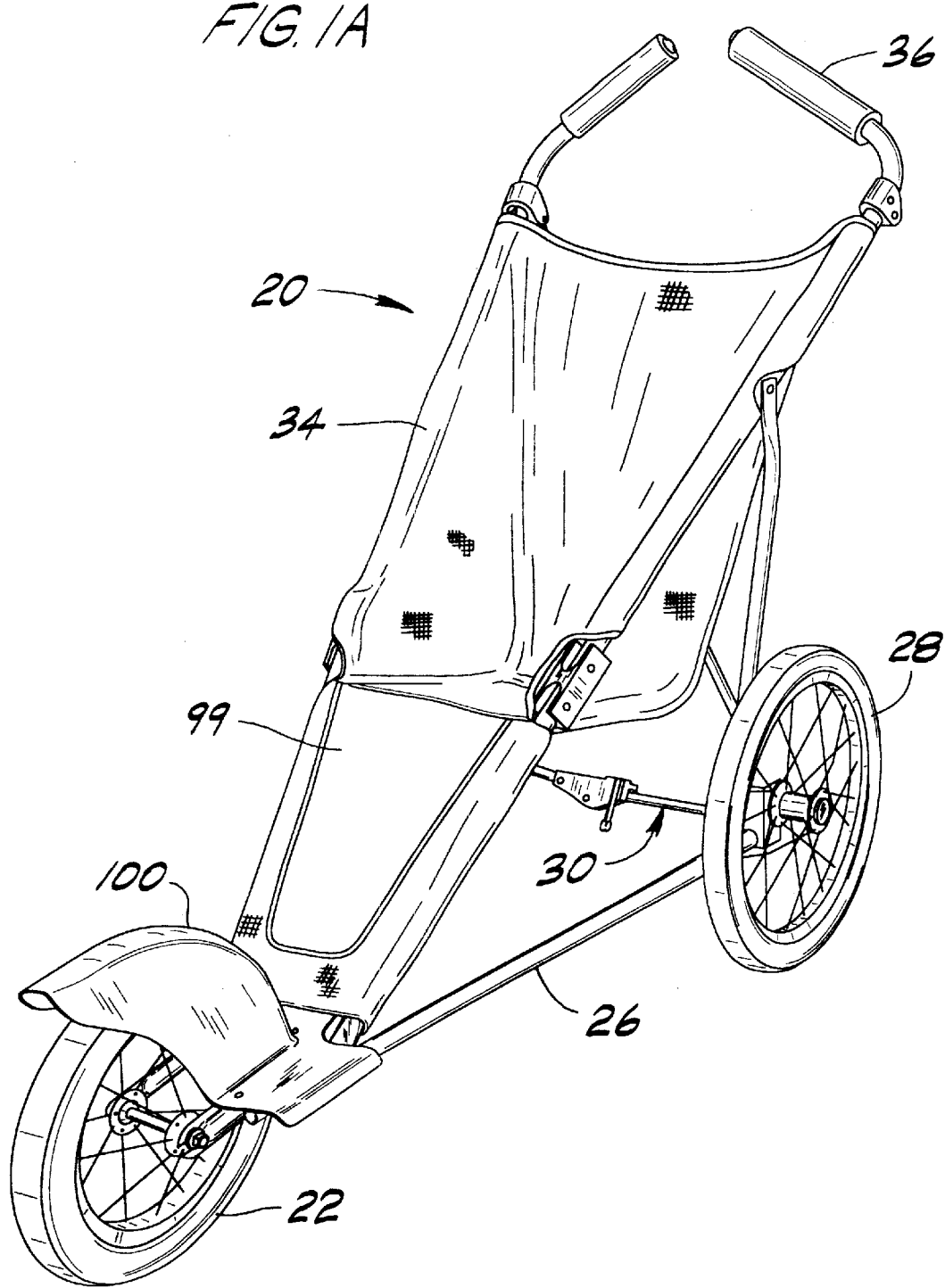
FIG. 1A is a perspective view like FIG. 1 showing a seat attached to the stroller.

Referring now to FIGS. 1–3 and 6–7, a collapsible stroller of the present invention is generally designated at 20. The stroller comprises a single front wheel 22 and a front wheel support, generally designated 24, mounting the front wheel for rotation on an axis extending transversely with respect to the stroller 20. Two generally horizontal side frame members 26 extend in a generally rearward direction from the front wheel support 24. Each side frame member 26 has a forward end 27 pivotally connected to the front wheel support 24 for pivoting about a generally vertical axis. Two rear wheels 28 are each rotatably mounted on a respective side frame member 26 adjacent its rearward end 29. A collapsible rear frame member, generally designated at 30, extends between the side frame members 26 generally between the rear wheels 28. The front wheel support 24, the horizontal side frame members 26 and rear frame member 30 combine to form a triangular lower frame 31 of the stroller 20. An upper frame 32 extends up from the lower frame 31 (and preferably from the side frame members 26) for supporting a flexible child seat 34 (see FIG. 1A) and a child (not shown) therein. A pair of handles 36 are attached to the upper frame 32 for pushing the stroller. The rear frame member 30 is lockable in an uncollapsed condition for holding the side frame members 26 in a diverging relationship in which they diverge rearwardly from the front wheel support 24. The rear frame member 30 is movable from the uncollapsed condition shown in FIG. 1 to a collapsed condition shown in FIG. 3 to permit the side frame members 26 to be pivoted about their respective vertical axes.

Figure 7:
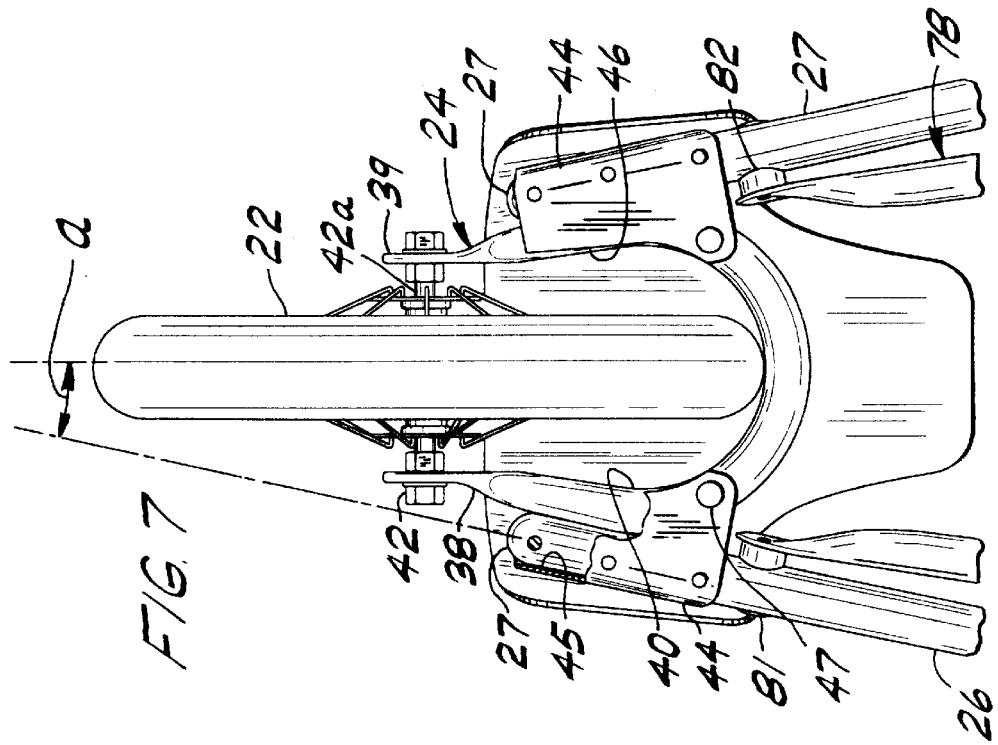
FIG. 7 is a fragmentary bottom plan view of a forward end of the stroller.

Referring to FIG. 7, the front wheel support 24 comprises a front fork 38 that is generally U-shaped and has forward ends 39 for supporting the front wheel 22 and arms 40 extending rearwardly from the forward ends on opposite sides of the front wheel. Holes in the forward ends 39 of the fork 38 receive threaded shafts 42a of the front wheel 22, and the wheel is secured to the fork by nuts 42b or quick release fasteners. It is to be noted that the wheel may be mounted in other ways, such as by any way conventionally used for bicycles or wheelchairs. The arms 40 of the front fork 38 are preferably made of a unitary piece of tubing formed into a U-shape, and the forward ends 39 may be formed from the same unitary piece of tubing by flattening each end. The front wheel 22 of this embodiment is a conventional spoked wheel measuring between 9–24 inches in diameter and having a pneumatic tire mounted thereon. It is contemplated that other types of tires may be used, such as molded urethane, foam or solid tires.

Each horizontal side frame member 26 is received in a connector 44 for pivotally connecting the frame member to one of the rearwardly extending arms of the front fork 38. Each connector 44 is in the shape of an open-ended channel having an inwardly facing curved web 45 which receives the respective side frame member 26 and is shaped to conform to the outer circumference of the side frame member. The horizontal side frame member 26 is fixedly attached to the connector 44 as by rivets (three rivets are shown) or other suitable fasteners. Opposing flanges 46 extend inward from the web 45 and are positioned above and below the horizontal side frame member 26 and the front fork 38 and are pivotally connected to the arm 40 of the front fork 38 by a single pivot 47 comprising a rivet or other suitable fastener. The horizontal side frame members 26 diverge in a rearward direction from the connectors 44 (FIG. 5). As the horizontal side frame member 26 is pivoted outward on the generally vertical axis defined by the pivot 47, its movement is preferably limited by the front fork 38. As shown in FIG. 7, the side frame member 26 engages the front fork 38 at some predetermined angle α relative to the longitudinal axis of the stroller 20. The front fork 38 and each connector 44 thus serve to limit the range of pivotal movement of the horizontal side frame member 26 to the predetermined angle α. It is to be noted that other types of connectors may be used, and that the side frame members may be mounted together in a single connector having a single pivot point on or adjacent the front wheel support. The connector 44 may be suitably formed from a single, unitary piece of plastic, though other materials are contemplated.

Figure 6:
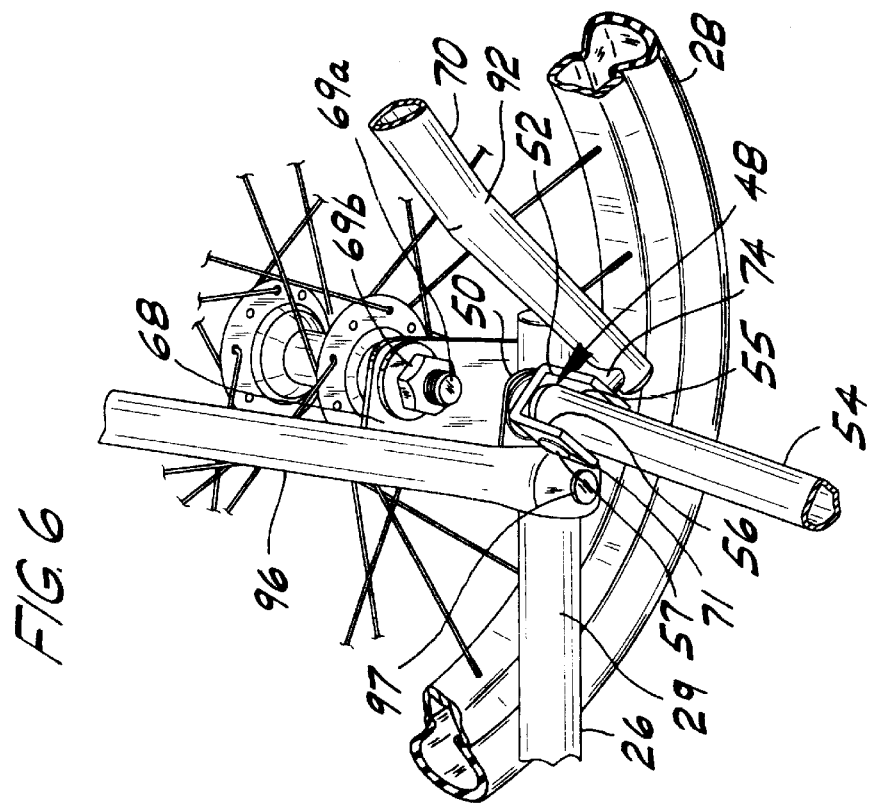
FIG. 6 is a fragmentary perspective view of the lower rearward end of the stroller.

Referring to FIGS. 5 and 6, the rear frame member 30 extends between rearward ends 29 of the horizontal side frame members 26 generally between the rear wheels 28 and is connected to each of the horizontal side frame members by knuckle joints, generally designated 48, which allow the rear frame member to pivot about at least two axes relative to each horizontal side frame member. As best shown in FIG. 6, each horizontal side frame member 26 has an inwardly facing mounting bracket 50 mounted, as by welding, on its rearward end 29. It is contemplated that the mounting bracket may be pivotally attached to the side frame member so as to rotate about a vertical axis. The knuckle joint 48 comprises a U-shaped clevis 52 rotatably mounted on the mounting bracket 50 by a rivet or other suitable fastener. Note that clevis may be of a different shape within the scope of this invention. The rear frame member 30 includes a first frame element 54, preferably in the form of a tubular bar, having an outward end 55 with a hole or eye (not shown) therethrough oriented transversely to the axis of the first element for mounting the element between opposing flanges 56 of the clevis 52. The first element 54 is pinned to the clevis by a rivet 57, or other suitable fastener, extending through eyes in the flanges (not shown) and the hole in the outward end of the first element. The first element 54 is thereby mounted for pivoting about the axis of the rivet 57, which is perpendicular to the flanges 56. Further, the clevis 52 and first element 54 are mounted to rotate as a unit relative to the horizontal side frame member 26 on an axis generally transverse to the horizontal side frame member. The rear frame member 30 also includes a second element 58, also preferably of tubular bar stock, mounted substantially in the same manner on the other of the horizontal side frame members 26.

Figure 8:
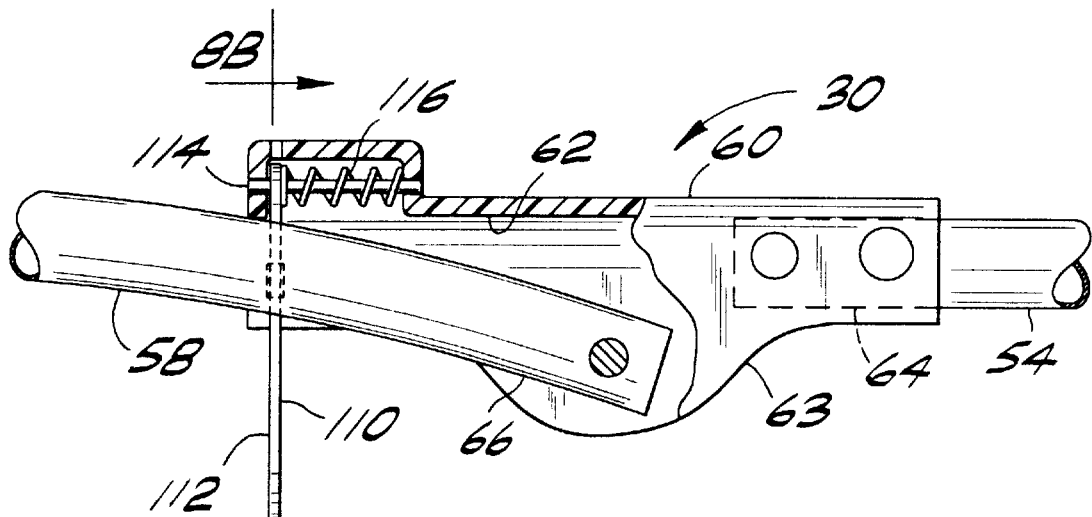
FIG. 8 is a fragmentary rear elevation from the rear of the stroller facing forward and showing a central hinge of a rearward member.

Referring to FIG. 8, the rear frame member 30 includes a central hinge 60 joining the first and second elements at their inward ends. The central hinge 60 defines a longitudinally extending, downwardly opening channel formed by a curved web 62 shaped to conform to the outer circumference of the first and second elements 54, 58. As viewed in FIG. 8, the hinge 60 is generally rectangular in shape, but includes a central downwardly projection extension 63. The first element 54 is fixed at its inward end 64 to a right end 65 (as viewed in FIG. 8) of the central hinge 60 by rivets or other suitable fasteners. The inward end 66 of the second element 58 is generally downwardly curved and is pivotally connected to the extension 63 of the hinge, as by a rivet.

Referring to FIG. 6, each horizontal side frame member 26 has a rear wheel mounting bracket 68 fixedly attached, such as by welding, to its rearward end 29. The bracket has a hole therethrough for receiving a threaded shaft 69a on the rear wheel 28, the shaft extending inward from the wheel through the hole and being secured to the bracket 68 by a nut 69b or a quick release fastener. It is to be noted that the wheels may be mounted in other ways, such as by any way conventionally used for bicycles or wheelchairs. As shown, the bracket 68 may be constructed of angle stock to increase its strength and rigidity. The rear wheels 28 of this embodiment are conventional spoked wheels measuring about 924 inches in diameter and having a pneumatic tire mounted thereon. It is contemplated that other types of tires may be used, such as molded urethane, foam or solid tires.

Referring to FIGS. 1, 3 and 6, the upper frame 32 includes upright rear supports 70 having pivot connections 71 at their lower ends to the first and second elements of the rear frame member 30. Preferably, the rivet 57 extending through the first element 54 and the clevis 52 further extends through the lower end of one of the upright rear supports 70 to form the pivot connection 71. Likewise, the rivet extending through the second element 58 and the clevis 52 further extends through the other of the upright rear supports 70. As shown in FIG. 6, a spacer 74 may be included between the upright rear support 70 and the clevis 52. The upright rear supports 70 extend up from the clevis connections 52 such that one of the upright rear supports crosses over the other at a crossover point 76, which will be discussed in more detail below.

Referring to FIGS. 1–4, the upper frame 32 also includes two inclined side members, each generally designated 78, which are supported by the upright rear supports 70 in the unfolded condition. The inclined side members 78 slope downward and forward from pivot connections 80 with upper ends of the upright rear supports 70 to pivot connections 81 with the forward ends 27 of the horizontal side frame members 26. It is contemplated that inclined side members 78 may be pivotally connected to other structure adjacent the front wheel, including the front fork 38. The pivot connections 80 between the inclined side members 78 and the upright rear supports 70 are preferably ball joints, though other joints such as universal joints may also be used. When the stroller 20 is moved to the folded condition, the pivoting motion of the upright rear supports 70 is generally centered on an axis (not shown) that pivots or rotates relative to the inclined side members. A conventional pivot connection might cause the upright rear supports 70 to bind as the stroller 20 is moved to the folded condition. Therefore, ball joints are used to connect the rear supports 70 and inclined side members 78, which allows relative rotary motion in several directions. It is to be understood that other joints which allow such motion may be used within the scope of this invention. The padded handles 36 extend from the rearward ends of the inclined side members 78. In this embodiment, each handle 36 extends inward and upward from the inclined side members 78 when the stroller 20 is in the unfolded condition. The handles 36 may be padded with resilient foam or another suitable material.

Figure 9:
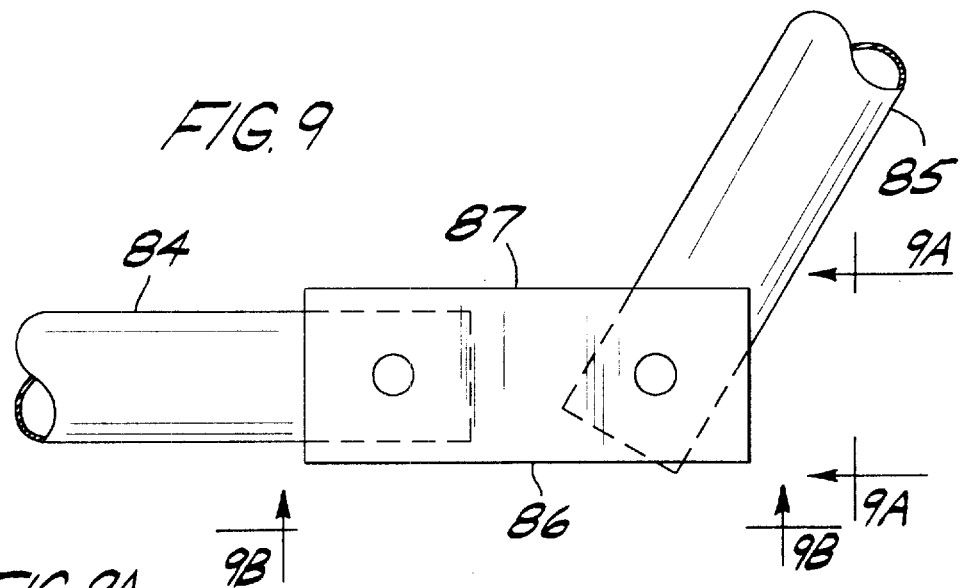
FIG. 9 is a fragmentary side elevation showing a "double-knuckle joint" for connecting a forward and rearward element.
Figure 9A:
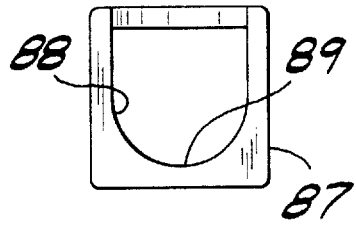
FIG. 9A is a section view taken in the plane of line 9A—9A of FIG. 9 with the forward and rearward elements omitted for clarity.
Figure 9B:
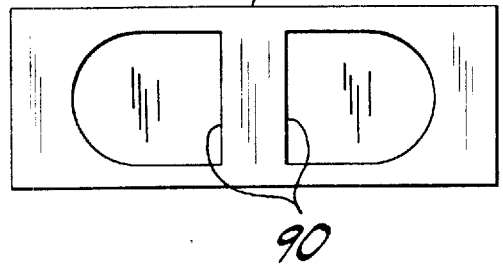
FIG. 9B is a section view taken in the plane of line 9B—9B of FIG. 9 with the forward and rearward elements omitted for clarity.

The pivot connection 81 of the inclined side members 78 to the horizontal side frame members 26 (see FIGS. 4 and 7) is preferably rearward of the connector 44. A rivet or other suitable fastener is used to connect the inclined side members 78 and the horizontal side frame members 26, and a spacer 82 may be inserted between the members. In this embodiment, each inclined side member 78 includes a forward element 84 and a rearward element 85, both preferably formed from tubular bar stock, which are joined together forward of the connection 80 with the upright rear support 70. As shown in FIGS. 9 and 9A, the forward and rearward elements 84, 85 are preferably joined by a "double knuckle" joint 86 arranged such that central longitudinal axes of the elements are generally coaxial when the inclined side member 78 is in the unfolded condition and such that the rearward element generally overlies the forward element when they are in the folded condition. As shown in FIGS. 1, 9, 9A and 9B, the double knuckle joint 86 includes a link block 87 having two channels 88 extending longitudinally from opposing ends of the block. The channels 88 have curved bottoms 89 shaped to conform to the rounded contour of the forward and rearward elements 84, 85. Openings 90 (FIG. 9B) extend through the channel bottoms to provide clearance for ends of the forward and rearward elements 84, 85 as they move from the unfolded to the folded condition (see FIG. 9). The forward and rearward elements 84, 85 are pivotally connected to the link block by rivets or other suitable fasteners.

The upright rear supports 70 are pivotally connected, as by a rivet, at the crossover point 76 to form a scissors-like arrangement which helps to provide stability and rigidity in the frame and facilitates a lateral motion relative to both the horizontal side frame members 26 and inclined side members 28 during folding and unfolding. The crossover point 76 is suitably positioned by including a bend 92 adjacent the lower end of each of the upright rear supports 70. As shown in FIGS. 1, 4 and 5, each of the upright rear supports includes the bend 92 between the crossover point 76 and the lower end, the bend is preferably both forwardly directed (see FIG. 4) and downwardly directed (see FIGS. 1 and 5). Additionally, one of the upright rear supports 70 includes two angles or bends 93 on opposite sides of the crossover point to define a rearwardly offset portion 94 at the crossover point 76 (See FIGS. 4–5), which enables the upright rear support to be moved to the folded position. The offset portion may be otherwise constructed within the scope of this invention.

As shown most clearly in FIGS. 4 and 6, the upper frame 32 also includes two intermediate supports 96 having pivot connections 97 at lower ends with the horizontal side frame members 26 and having pivot connections 98 at upper ends with the inclined side members 78. The intermediate supports 96 are connected to the horizontal side frame members 26 forward of the mounting brackets 50, 68, and are connected to the rearward elements 85 of the inclined side members 78 forward of their connection 80 with the upright rear supports 70. It is contemplated that the intermediate supports may be connected at the mounting brackets 50, 68. The intermediate supports 96 are oriented generally vertical when the stroller 20 is in the unfolded condition. The intermediate supports 96 are pivotally connected by rivets or other suitable fasteners. It is to be understood that the positioning and orientation of the intermediate supports may be other than as described without departing from the scope of the invention.

It is to be understood that the various frame members and elements described above are preferably constructed of tubing, such as aluminum or steel tubing.

Figure 8B:
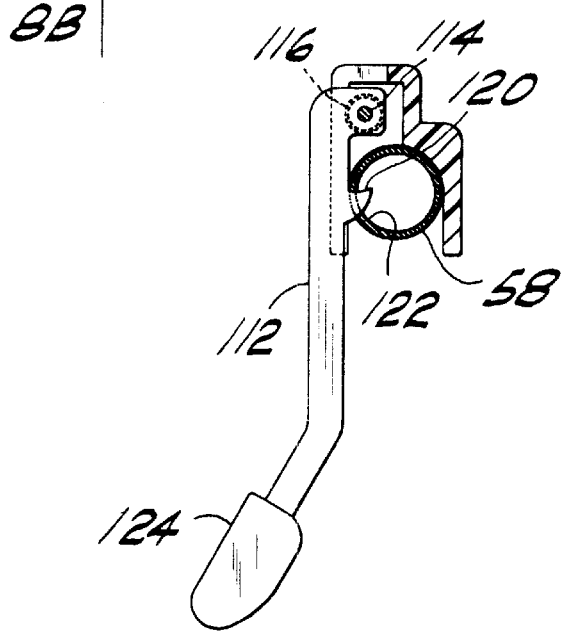
FIG. 8B is a section view taken in the plane of line 8B—8B of FIG. 8.

As shown in FIGS. 8 and 8B, the central hinge 60 includes a latching device 110 for locking the rear frame member in its unfolded condition. In this embodiment, the latching device 110 includes a metal bar 112 extending down from the hinge 60 and pivotally mounted, as by a pivot pin 114, on the hinge. A coil spring 116 on the pin 114 is attached to the bar 112 and to the hinge 60 to bias the bar toward the latched position. An upwardly angled tooth 120 is disposed on the bar 112 and projects rearwardly therefrom for engaging the second element 58 of the rear frame member 30. The tooth 120 is positioned and shaped to engage the second element 58 when the rear frame member 30 is in the unfolded condition so as to secure the rear frame member in its unfolded (straightened) condition. The second element 58 includes a hole or groove 122 sized to receive the tooth. As the rear frame member 30 is pivoted down into the unfolded condition, the tooth 120 engages the second element 58 and then is received in the groove 122. Thereafter, if the rear frame member 30 is pushed or pulled up without releasing the latching device 110, the angle of the tooth 120 causes the tooth to more positively engage the second element 58, i.e., extend deeper into the groove 122, so as to effectively stop any significant upward movement. The bar 112 has a release knob 124 at its lower end for releasing the latching device 110. Note that other latching devices are contemplated within the scope of this invention.

Referring to FIG. 1A, the seat 34 is attached to the stroller 20 to extend between the inclined side members 78. A seat belt (not shown) is preferably included for securing the child in the seat 34. The seat 34 is fabricated from segments of canvas sewn together to support a child. Preferably, a flexible footrest 99 including a fabric panel for supporting the child's feet is attached to the inclined side members to extend forward and downward from the seat 34. Preferably, a mudguard 100 is positioned adjacent the front wheel 22 to shield the child from mud and debris that is flung from the front wheel.

Referring to FIGS. 1–3, the stroller 20 is collapsed by simultaneously disengaging the latching device 110 and moving the central hinge 60 of the rear frame member 30 upward. This may be easily accomplished by a person positioned behind the stroller 20 kicking, as with a foot, the knob 124 generally forward (toward the front of the stroller) and the central hinge 60 generally upward. The tooth 120 of the latching device 110 is thereby disengaged from the second element 58 and the rear frame member 30 may be folded about the central hinge 60 to its folded condition. The upward motion of the central hinge 60 forces the outward ends of the first and second elements 54, 58 toward one another. As shown in FIG. 3, the outward ends of the first and second elements 54, 58 are adjacent one another when the stroller 20 is in the folded condition. The motion of the rear frame member 30 automatically and simultaneously forces the diverging side frame members 26 to pivot inward toward one another to a more parallel position. Preferably, this motion also automatically and simultaneously forces the upright rear supports 70 to pivot inward with a scissors-type movement, which causes the inclined side members 78 to move inward and to rotate or fold about respective double knuckle joints such that the handles 36 move generally forward and downward (FIG. 2). This latter motion also causes the intermediate supports 96 to pivot forward about their respective connections 97 with the horizontal side frame members 26. These several motions preferably occur simultaneously without the user exerting force on the individual frame members other than the hinge 60 of the rear frame member 30. In the fully collapsed position, shown in FIG. 3, the handles 36 preferably straddle the front wheel 22 such that the stroller is generally in a compact bundle of generally parallel members and supports so that the stroller is easily shipped and stored. The overall height of the stroller 20 is now about equal to the height of the mudguard 100 and rear wheels 28. Importantly, the width of the stroller 20 in the folded condition is substantially less than its width in the unfolded condition. Moreover, the overall length of the stroller 20 is less in the folded or collapsed condition because the upper frame 32, more specifically, the inclined side members 78 and upright rear supports 70, fold forward as shown. If desired for storage purposes, the wheels may also be removed to make the stroller 20 even more compact.

Figure 8A:
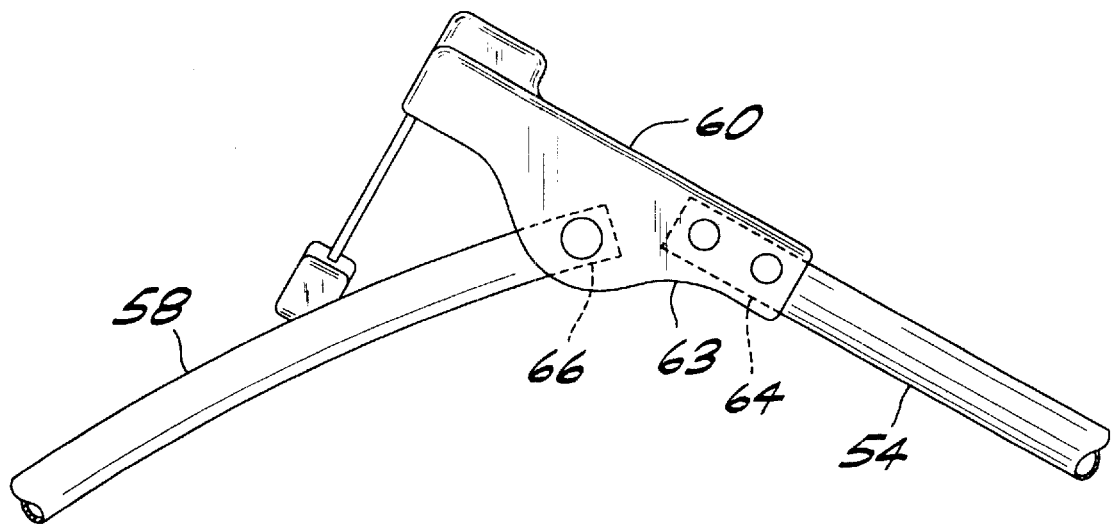
FIG. 8A is a fragmentary rear elevation like FIG. 8 showing a central hinge of a rearward member in a partially collapsed position.

To return the stroller 20 to its unfolded condition, the handles 36 are moved upward and rearward. The central hinge 60 is preferably moved to an over-center position to help lock the rear frame member 30 in the uncollapsed or unfolded condition in which the second element 58 is angled slightly downward in a locked or over-center position. Preferably, both the latching device 110 and the central hinge 60 hold the rearward frame member 30 in the unfolded condition. As the hinge 60 is pushed downward from its collapsed condition (shown in FIG. 8A) into its center position, the horizontal side frame members 26 are pushed outward by the first and second elements 54, 58 such that the forward ends 27 of the side frame members are pressed inward against the front fork 38. In this unstable center position of the central hinge 60, the horizontal side frame members 26 are flexing outward along their length due to the contact between their forward ends 27 and the front fork 38. Simultaneously, the upper connections 80 of the upright rear supports 70 "scissor" or flex outward and downward, which forces the rearward elements 85 at their connection 80 to also move outward and downward and preferably to be placed in some amount of tension due to their connections 98 with the intermediate supports 96. Thus, it will be seen that the intermediate supports 96 are forcing the inclined side members 78 generally upward while the upright rear supports 70 are forcing the rearward element 85 generally downward and outward. The central hinge 60 is then pressed further downward into its over-center position, causing the latching device 110 to engage the second element 58 and causing the horizontal side frame members 26 to flex back inward somewhat to a more relaxed position. Likewise, the tension in the rearward element 85 is somewhat reduced. Preferably, however, some amount of tension remains in the rearward elements 85 of the inclined side members 78 between the connections 80 and 98 even when the rearward frame member is in the over-center position to assure that the double knuckle joints 86 will be completely unfolded and that the inclined side members 78 will be relatively rigid. Moreover, such tension serves to make the entire stroller 20 more rigid in the unfolded condition. The rear frame member 30 is thereby locked, preferably by the central hinge 60 and by the latch 110 thereon, to hold the horizontal side frame members 26 and stroller 20 in the unfolded condition.

In view of the above, it will be seen that the several objects of the invention are achieved and other advantageous results attained.

When introducing elements of the present invention or the preferred embodiment(s) thereof, the articles "a", "an", a "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A collapsible three-wheeled stroller for transporting a child, said stroller comprising:
    a frame movable between folded and unfolded conditions,
    a handle mounted on an upper portion of the frame for pushing the stroller,
    only one front wheel and two rear wheels rotatably mounted on a lower portion of the frame,
    a seat on the frame for supporting a child,
    the frame being constructed from a plurality of articulated frame members movable from said unfolded condition to said folded condition with accompanying motion of the rear wheels toward one another and a generally forward and downward motion of the handle.

2. A stroller as set forth in claim 1 wherein the upper portion of the frame includes a pair of side members movable from an inclined position when the frame is in its unfolded condition to a collapsed position overlying the lower portion of the frame when the frame is in said folded condition.

3. A stroller as set forth in claim 2 wherein said side members extend rearwardly from generally adjacent the front wheel of the stroller toward the back of the stroller, the upper frame portion having no transverse members between said side members so that the stroller is adapted to automatically move to a collapsed condition when a rear frame member is moved to its collapsed condition.

4. A stroller as set forth in claim 1 further comprising a single locking mechanism to lock the frame in its unfolded condition, and wherein the frame is free of any other locking mechanism so that movement of the frame from said unfolded condition to said folded condition may be accomplished without the need to disengage any locking mechanism other than said single locking mechanism.

5. A method of collapsing a collapsible three-wheeled stroller for transporting a child, the stroller including a frame having upper and lower portions movable between folded and unfolded conditions, said frame comprising a plurality of articulated frame members, a handle mounted on the upper portion of the frame for pushing the stroller, only one front wheel and two rear wheels rotatably mounted on the lower portion of the frame, a seat on the frame for supporting a child, and a latching device for locking the frame in said unfolded condition, the method comprising:

simultaneously disengaging the latching device and moving at least one of said articulated frame members toward a collapsed position to cause accompanying motion of the rear wheels toward one another and a generally forward and downward motion of the handle.

6. A method as set forth in claim 5 wherein the simultaneous disengaging and moving steps are accomplished solely by a foot of a user.

7. A collapsible stroller for transporting a child, the stroller comprising:

a single front wheel;
a front wheel support mounting said front wheel;
two generally horizontal side frame members, each side frame member having a forward end pivotally connected to the front wheel support and a rearward end;
two rear wheels each rotatably mounted on a respective side frame member adjacent its rearward end;
a collapsible rear frame member extending between the side frame members generally between the rear wheels;
an upper frame extending up from the side frame members for supporting a child seat and the child therein; and
a handle attached to said upper frame;
the rear frame member including a latching device for locking the rear frame member in an uncollapsed condition for holding the side frame members in a diverging relationship in which they diverge rearwardly from the front wheel support, the latching device having a release for allowing movement of the rear frame member from said uncollapsed condition to a collapsed condition to cause the side frame members to pivot toward one another.

8. A collapsible stroller as set forth in claim 7 wherein the side frame members pivot about their respective vertical axes and the upper frame simultaneously moves to its collapsed condition as the rear frame member is moved to its collapsed condition.

9. A collapsible stroller as set forth in claim 7 wherein the upper frame comprises first and second inclined side members extending rearwardly from front to back of the stroller, the upper frame having no transverse members between the inclined side members so that the stroller is adapted to automatically move to a collapsed condition when the rear frame member is moved to its collapsed condition.

10. A collapsible stroller as set forth in claim 9 wherein the upper frame further comprises first and second upright rear supports having lower ends pivotally connected to said rear frame member and upper ends pivotally connected to the inclined side members, the first and second upright rear supports extend from said rear frame member such that the first upright rear support crosses over the second upright rear support at a crossover point, the first and second upright rear supports being pivotally connected at the crossover point.

11. A collapsible stroller as set forth in claim 10 wherein the upper frame further comprises two intermediate supports pivotally connected to the horizontal side frame members and to the first and second inclined side members.

12. A collapsible stroller as set forth in claim 11 wherein the intermediate supports are sized to be in compression and the upright rear supports are sized to be in tension when the stroller is in its unfolded condition.

13. A collapsible stroller as set forth in claim 9 wherein the handle extends from one of said first and second inclined side members and another handle extends from the other of the first and second inclined side members.

14. A collapsible stroller as set forth in claim 7 wherein when the stroller is in its unfolded condition, said side frame members and rear frame member form a generally coplanar triangular lower frame which rigidities the stroller.

15. A collapsible stroller as set forth in claim 7 wherein the latching device is the only device on the stroller for locking the rear frame member in the uncollapsed condition when the stroller is in its unfolded condition, and wherein the lower and upper frame are free of any other latching device so that movement of the stroller from said unfolded condition to a folded condition may be accomplished without the need to disengage any latching device other than said latching device.

16. A collapsible stroller for transporting a child, said stroller comprising:

a lower frame rotatably mounting a front wheel and two rear wheels, the lower frame comprising:
two side frame members diverging in a rearward direction from generally adjacent the front wheel to generally adjacent the rear wheels when the stroller is in an unfolded condition,
a collapsible rear frame member extending between the side frame members generally between the rear wheels; and an upper frame comprising:
first and second upright rear supports having lower ends pivotally connected to said lower frame;
a first inclined side member having a rearward element pivotally connected to an upper end of the first upright rear support;
a second inclined side member having a rearward element pivotally connected to an upper end of the second upright rear support;
the first and second inclined side members sloping downward and forward from respective said first and second upright rear supports to said side frame members of the lower frame when the stroller is in said unfolded condition, each inclined side member including a forward element pivotally connected to a respective side frame member;
a hinge connecting the forward and rearward elements of each inclined side member such that the side members are foldable; and first and second upright intermediate supports pivotally connected to said lower frame and to respective first and second inclined side members generally forward of the connection between the upright rear supports and the inclined side members and generally rearward of said respective hinges connecting the forward and rearward elements;

the upright rear supports and the upright intermediate supports sized and configured for maintaining the inclined side members in an unfolded condition when the stroller is in its unfolded condition;

the rear frame member including a latching device for locking the rear frame member in an uncollapsed condition for holding the side frame members in a diverging relationship in which they diverge rearwardly from the front wheel support, the latching device having a release for allowing movement of the rear frame member from said uncollapsed condition to a collapsed condition to cause the side frame members to pivot toward one another and the upper frame to simultaneously move to its collapsed condition.

17. A collapsible stroller as set forth in claim 16 wherein the upper frame has no transverse members between the inclined side members so that the stroller is adapted to automatically move to a collapsed condition when the rear frame member is moved to its collapsed condition.

18. A collapsible stroller as set forth in claim 17 wherein the first and second upright rear supports extend from said rear frame member such that the first upright rear support crosses over the second upright rear support at a crossover point, the first and second upright rear supports being pivotally connected at the crossover point.

19. A collapsible stroller as set forth in claim 18 wherein the intermediate supports are sized to be in compression and the upright rear supports are sized to be in tension when the stroller is in its unfolded condition.

20. A collapsible stroller as set forth in claim 19 wherein when the stroller is in its unfolded condition, said side frame members and rear frame member form a generally coplanar triangular lower frame which rigidities the stroller.

21. A collapsible stroller as set forth in claim 20 wherein the latching device is the only device on the stroller for locking the rear frame member in the uncollapsed condition when the stroller is in its unfolded condition, and wherein the lower and upper frame are free of any other latching device so that movement of the stroller from said unfolded condition to a folded condition may be accomplished without the need to disengage any latching device other than said latching device.

* * * * *

UNITED STATES PATENT AND TRADEMARK OFFICE
CERTIFICATE OF CORRECTION

PATENT NO.    : 6,533,310 B2
DATED         : March 18, 2003
INVENTOR(S)   : Timothy J. C. O'Shea et al.

It is certified that error appears in the above-identified patent and that said Letters Patent is hereby corrected as shown below:

Column 10,
Line 6, "rigidities" should read -- rigidifies --.

Column 12,
Line 4, "rigidities" should read -- rigidifies --.

Signed and Sealed this

Twelfth Day of August, 2003

JAMES E. ROGAN
*Director of the United States Patent and Trademark Office*